April 3, 1956     W. E. PARKS     2,740,429
CORNER UNIT FOR ELECTRIC CONNECTION ASSEMBLY
Filed Aug. 12, 1953     2 Sheets-Sheet 1
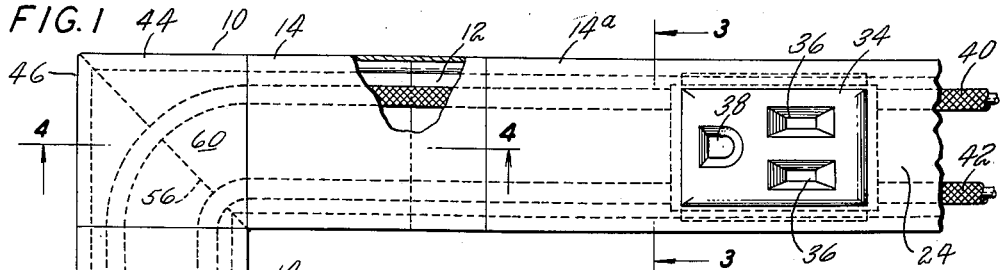
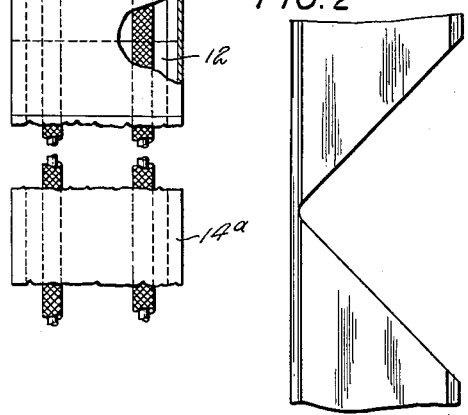
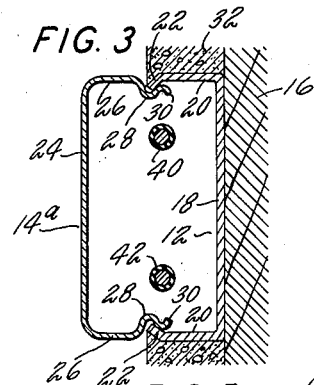
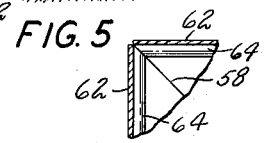
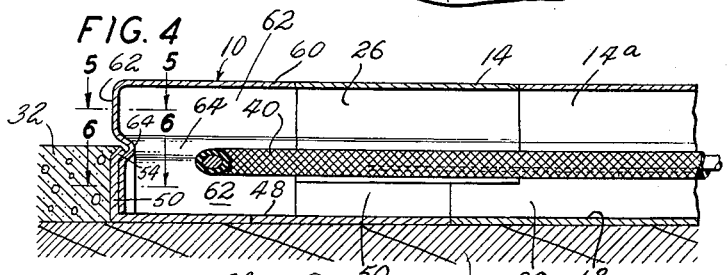
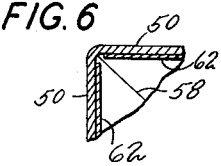
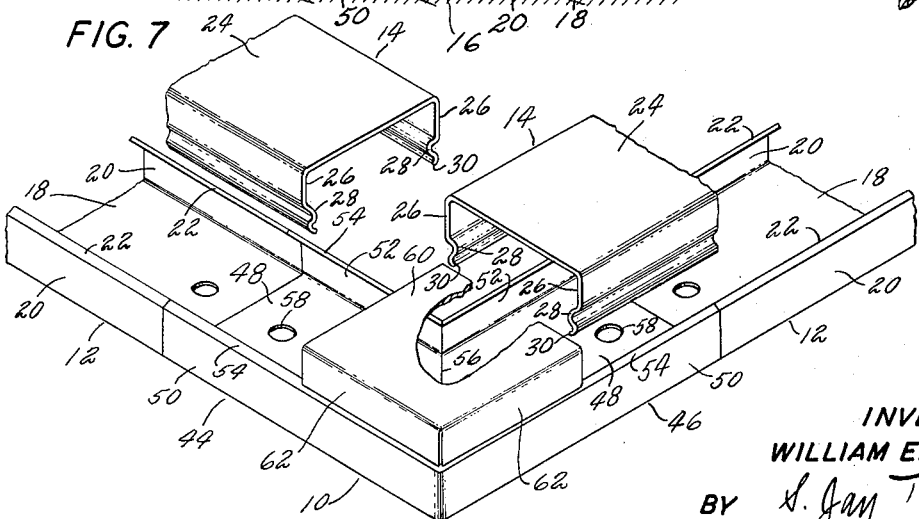
INVENTOR
WILLIAM E. PARKS
BY *S. Jay Tiller*
ATTORNEY April 3, 1956 W. E. PARKS 2,740,429
CORNER UNIT FOR ELECTRIC CONNECTION ASSEMBLY
Filed Aug. 12, 1953 2 Sheets-Sheet 2
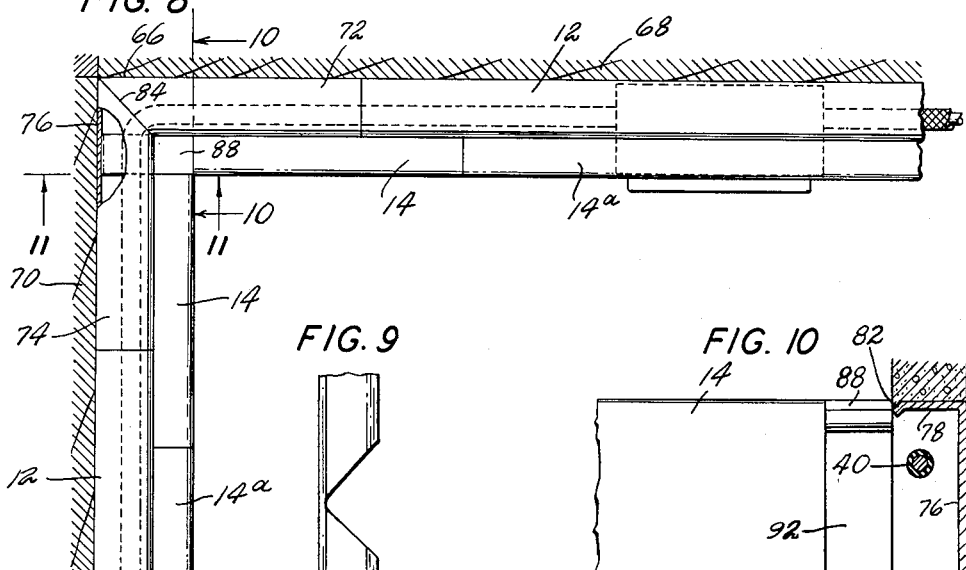
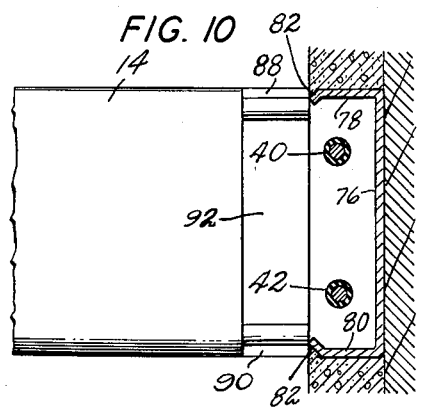
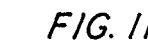
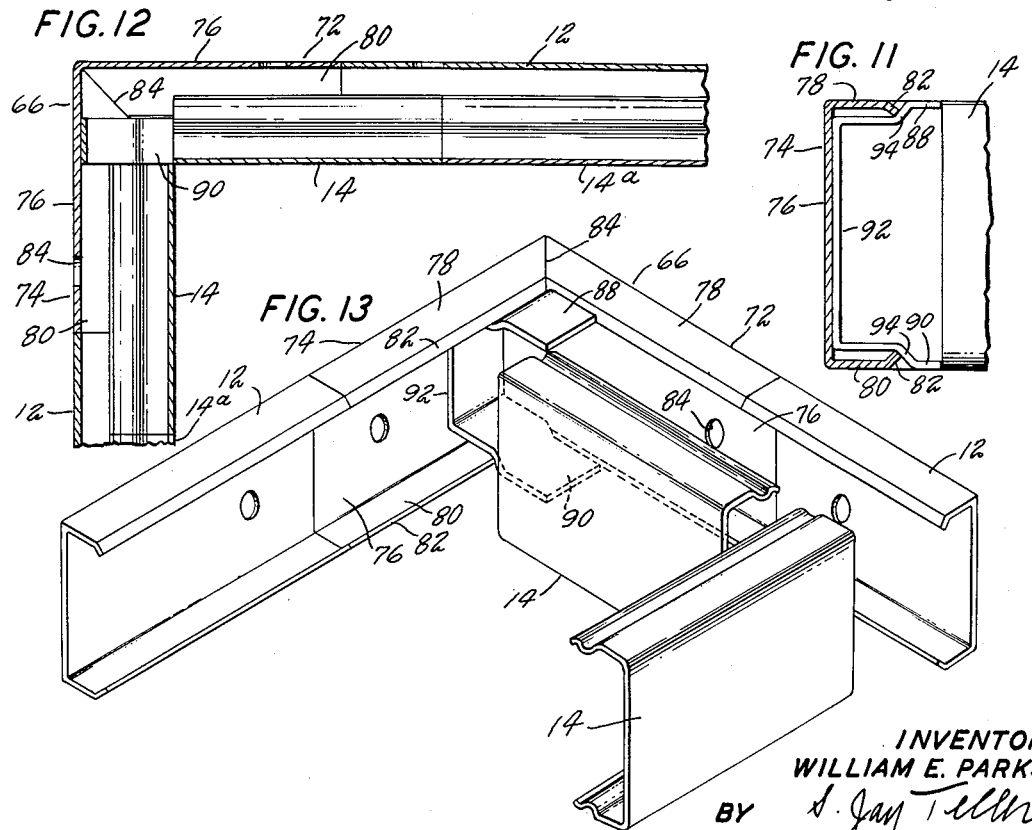
INVENTOR
WILLIAM E. PARKS
BY
ATTORNEY

United States Patent Office 2,740,429
Patented Apr. 3, 1956

2,740,429

CORNER UNIT FOR ELECTRIC CONNECTION ASSEMBLY

William E. Parks, Waterbury, Conn., assignor to The Wiremold Company, West Hartford, Conn., a corporation of Connecticut Application August 12, 1953, Serial No. 373,719

2 Claims. (Cl. 138—75)

The invention relates to a corner unit for an electrical connection assembly comprising two wire conduits in perpendicular relationship with each other, the said corner unit providing a connection between the two conduits at the angle between them. A corner unit embodying the invention is particularly adapted for use with an electrical wiring and connection assembly as disclosed in my copending application Serial No. 298,552 filed July 12, 1952.

The general object of the invention is to provide a corner unit for the stated purpose which is simple and inexpensive, which can be readily installed, which is so constructed that the other parts of the assembly including wires can be readily connected therewith, and which after assembly presents an external appearance harmonizing with that of the conduits.

Other objects of the invention will be apparent from the drawings and from the following description.

In the drawings I have shown two embodiments of the invention, but it will be understood that various changes may be made from the constructions shown, and that the drawings are not to be contrued as defining or limiting the scope of the invention, the claims forming a part of this specification being relied upon for that purpose.

Of the drawings:

Fig. 1 is a front view of a corner unit embodying the invention and also of other parts of the electric connection assembly.

Fig. 2 is a plan view of a corner blank for Fig. 1 as cut before bending into a corner.

Fig. 3 is a vertical sectional view taken along the line 3—3 of Fig. 1.

Fig. 4 is an enlarged horizontal sectional view taken along the line 4—4 of Fig. 1.

Fig. 5 is a fragmentary sectional view taken along the line 5—5 of Fig. 4.

Fig. 6 is a fragmentary sectional view taken along the line 6—6 of Fig. 4.

Fig. 7 is an exploded perspective view of the corner unit and of some of the associated parts.

Fig. 8 is a plan view of an alternative corner unit embodying the invention and also of other parts of the electric connection assembly.

Fig. 9 is a plan view of a corner blank for Fig. 8 as cut before bending into a corner.

Fig. 10 is a vertical sectional view taken along the line 10—10 of Fig. 8.

Fig. 11 is a vertical sectional view taken along the line 11—11 of Fig. 8.

Fig. 12 is a horizontal sectional view taken midway between the top and the bottom of the assembly.

Fig. 13 is an exploded perspective view of the alternative corner unit and of some of the associated parts.

Referring to the drawings and more particularly to Figs. 1 to 7 thereof, 10 represents in its entirety a corner unit embodying the invention. The said corner unit 10 is adapted to provide a connection between two channel shaped base strips 12, 12 arranged in perpendicular relationship and also between two channel-shaped cover members 14, 14 engaged respectively with the base strips 12, 12 to form conduits. Each of the base strips 12 and cover strips 14 may be one of a series of such strips for example 14ª all in longitudinal alignment.

As shown in Figs. 1 to 7, the base strips 12, 12 of both series are mounted on the same supporting wall 16 but the principles of the invention are not limited to connecting horizontal and vertical strips but may be applied in other ways, one of which will be described hereinafter in connection with Figs. 8-13.

The base strips 12 are preferably formed of sheet metal. It has a rear wall 18 adapted to directly engage the flat face of a rear supporting wall such as 16 as shown in Fig. 2, and it has forwardly projecting parallel side walls 20, 20. The said rear wall 18 of the strip may be provided with holes or knockouts, for receiving screws for the attachment of the strip to the rear supporting wall 16. The side walls 20, 20 are inwardly bent at their edges to provide portions 22, 22 having rearwardly facing interior longitudinal shoulders which are spaced forwardly from the rear wall 18.

Each cover member 14 or 14ª is formed of sheet metal and is generally U-shaped in cross section, the said cover member having a vertical front wall 24 and parallel side walls 26, 26 and the said cover member being initially open at the rear. Each cover member 14 cooperates with one or more base strips 12 to constitute a wire conduit.

Interengaging snap acting means are provided on each cover member 14 or 14ª and on the corresponding base strip 12 for retaining the said cover member in a fixed predetermined position with respect to the said base strip. Preferably the side walls 26, 26 of the cover member are provided adjacent the rear edges thereof with inwardly projecting longitudinal beads 28, 28 and with inwardly inclined portions 30, 30 at the rear of the beads. The walls 26, 26 are so spaced that the said inclined portions 30, 30 at the rear thereof will engage the portions 22, 22 of the base strip when the cover member 14 is moved rearwardly toward the said base strip. This effects snap engagement, as the said portions 22, 22 enter in the exterior grooves provided by the beads 28, 28. The said grooves have forward facing longitudinal shoulders which engage with the rearward facing shoulders on the base strip portions 22, 22.

The metal of each cover member 14 is preferably substantially thinner than that of the base strip 12, so as to provide relatively greater flexibility for the walls 26, 26. Due to the thickness of the metal of the base strip 12, the side walls 20 thereof are substantially rigid while the rear portions of the side walls 26, 26 of the cover flex inwardly toward each other when the cover is pushed rearward in applying it to the base. A rearward movement is continued, the walls 26, 26 snap outwardly again, away from each other so that the edges 22, 22 on the base strip engage in the exterior grooves provided by the beads 28, 28 on the cover member.

Each channel member 14ª may carry at least one receptacle 34 provided with two or more slots 36 and 38 within which are contacts for engagement by the prongs of an electrical connection plug. The contacts are connected respectively with conductor wires 40 and 42 which extend longitudinally of the channel member.

Corner unit 10 comprises two similar channel shaped base strip portions 44 and 46 fixedly joined with each other at a right angle and having open ends for abutting aligned engagement with the ends of two base strips 12, 12 to be connected. Each of the base strip portions 44 and 46 has a rear wall 48 located in a common plane and two parallel forwardly extending side walls 50 and 52, having the same size and shape in cross section as the adjacent base strip 12, the side walls 50, 50 and 52, 52 having inturned edge portions 54, 54 similar to the portions 22, 22 of the base strip side walls. When assembled, each base strip portion 44 or 46 aligns exactly with an adjacent base strip 12.

To make the base portion of the corner unit 10, a base strip of any desired length has a 90° notch cut through one side wall and the rear wall leaving the other side wall intact, as shown in Fig. 2. Said other side wall is then bent at the apex of the notch to cause the diverging edges of the notch to come together forming a butt joint along the diagonal corner-line 56 of the corner. The corner thus formed may be welded or otherwise suitably secured in bent position.

With the base strip portions 44 and 46 of the corner unit 10 in aligned relationship respectively with the two base strips 12, 12, the two cover members 14, 14 may be engaged in overlapping relationship one end with the said base portions of the corner and at the other end with the base strips 12 of the conduit. The cover members 14, 14 are positioned with their interior corners in contact or substantially so, leaving a space over the corner between the ends of the covers 14, 14.

In order to cover and close over this space, the corner unit 10 includes at least one filler wall fixedly connected with the base strip portions near the joined ends thereof and positioned for aligned abutting engagement with the adjacent ends of the two cover members 14, 14.

The front filler has a flat and preferably square top wall coplanar with the top walls of the covers 14, 14 so as to cover over the area between the proximate ends of the cover member at the corner. The filler is stamped as a unit from sheet metal with two side walls 62 bent down from those adjacent sides which will be the exterior sides of the filler when it is in use. The walls 62 each have formed therein an interior bead 64 parallel to but spaced below the top edges of the filler, thus providing an exterior groove into which engage the inturned edges 54 of the side walls 50 of the base portion of the corner. The walls 62 extend onward nevertheless into the base portion of the corner to the bottom 48 thereof in order to properly locate the top wall 60 of the filler.

The filler may be affixed to the base portion of the corner unit by spot welding the sides 62 of the filler to the walls 50, or otherwise.

Prior to attaching of the cover members 14, 14, there is an unobstructed space between the interior portion of the front wall 60 and the interior side walls 52, 52, this being apparent from Figs. 4 and 7. This unobstructed space makes it possible for the conductor wires 40 and 42 to be readily moved into positions behind the wall 60. The said wires may have been previously connected with the receptacles 34 on the cover members 14ª, 14ª and without the said uninterrupted space the wires could not be put in place without cutting them.

In assembly, the corner unit 10 and the base strips 12, 12 are put in place on the wall 16 with the ends of the portions 44 and 46 of the corner unit in aligned abutting relationship with the said base strips. Then the cover members 14, 14 and 14ª, 14ª are engaged with the base strips to form closed conduits. The sequence of engagement of the cover members may be varied, but ordinarily the cover members 14ª, 14ª are engaged first to form conduits in which the receptacles 34 and portions of the wires 40 and 42 are located. Other portions of the said wires 40 and 42 between adjacent ends of the said conduits are entered within the base portion of the corner unit and behind the front wall 60 thereof. The cover members 14, 14, when engaged with the base strips 12, 12 and with the base strip portions 44 and 46, cooperate with the corner unit to complete a continuous closed conduit. The spaces between the ends of the adjacent cover members 14, 14 are closed by the front wall 60 and by the auxiliary side walls 62, 62. In the completed assembly, as shown in Fig. 1, the corner unit harmonizes with the other parts of the assembly, only the front wall 60 thereof being visible from the front.

The invention may also be employed for connecting conduits formed like those already described, but which run along two separate walls and come together at a right angle corner. As arranged for that purpose, the invention is illustrated in Figs. 8–13.

The corner unit 66 comprises a base portion having two integral legs 72, 74 extending at right angles. In cross section the legs are identical; and their cross sections are also identical with the cross sections of the base strips 12 of the conduits. Thus, the ends of the legs 72, 74 can be engaged in abutting alignment with the base strips 12 which the corner is to connect. Specifically, each leg 72, 74, has a rear wall 76 and two parallel side walls 78, 80 which abut at the diagonal corner line 84; and each side wall has an inturned longitudinal edge 82 like the inturned edges 22 on the base strip walls.

The base portion of the corner unit may be formed following a procedure similar to that in making the base portion of Figs. 1–7. Again, a length of base strip 12 may be taken and a 90° notch cut therein; but in this instance, the notch is made (as indicated in Fig. 9) by converging cuts through the side walls 78, 80 from the inturned edges 82 thereof to, but not through, the bottom or back wall 76 of the base strip. The back wall is then bent at right angles to cause the inclined edges of the side walls to meet in diagonal corner line 84.

With the base strip portions 72 and 74 of the corner unit 66 in aligned relationship respectively with the two base strips 12, 12, the two cover members 14, 14 may be engaged in overlapping relationship with the said base portions of the corner and at the other end with the base strips 12 of the conduit. The cover members 14, 14 are positioned with the adjacent edges of their front walls in contact or substantially so, leaving a space over the corner between the ends of the covers 14, 14.

In order that the full area of the conduit shall be available for the passage of conductor wires at the corner without the need of making 45° angle cuts at the adjoining ends of the cover members 14, which are difficult to cut accurately and to join in a perfect joint, square filler walls 88 and 90 are provided as a fixed part of the corner unit. These walls are in the same plane as the side walls of the cover members 12 and fill the space between adjacent right angle cut ends of adjoining cover members 12, as may be seen in Fig. 8.

The filler walls are provided as the end portions of a U-shaped stamped sheet metal member having its transverse portion 92 lying against the back wall 76 of the corner and being spot welded or otherwise affixed thereto. The parallel side portions or legs of the U-member are offset inwardly to get around the inturned edges 82 of the side walls 78 and 80 of the corner unit 70.

In assembly, the corner unit 66 and the base strips 12, 12 are put in place on the walls 68 and 70 with the ends of the portions 72 and 74 of the corner unit in aligned abutting relationship with the said base strips. Then the cover members 14, 14 and 14ª, 14ª are engaged with the base strips to form closed conduits. The sequence of engagement of the cover members may be varied, but ordinarily the channel members 14ª, 14ª are engaged first to form conduits in which the receptacles 34 and portions of the wires 40 and 42 are located. Other portions of the said wires 40 and 42 between adjacent ends of the said conduits are entered within the channel portions of the corner unit. The cover members 14, 14, when engaged with the base strips 12, 12 and with the base strip portions 72 and 74, cooperate with the corner unit to complete a continuous closed conduit. The spaces between the ends of the top and bottom side walls adjacent channel members 14, 14 are closed by the filler walls 88 and 90. In the completed assembly, as in Fig. 1, the corner unit harmonizes with the other parts of the assembly, only the upper filler wall 90 thereof being visible from the top.

The invention claimed is:

1. A corner unit for connecting identical sections of electric conduits comprising channel-shaped base portions extending at right angles and open forwardly to permit laying in of unbroken lengths of conductor wires, each portion having a cross section identical to the cross section of a conduit base strip which is to be connected in alignment therewith, the longitudinal edges of said base portions being inturned forming a shoulder for engagement in a groove in a channel-shaped strip which is adapted to cover over certain parts of said base portions but leaving an opening at the juncture of said base portions, and a filler member connected with said corner unit and having walls closing said opening and lying in the same planes respectively as the walls of the adjoining cover-strip, said filler member being U-shaped and having its transverse portion welded to the bottom of one of the channel-shaped base portions.

2. A corner unit as claimed in claim 1 in which the legs of the filler are offset adjacent said inturned edges of the base portions to cause the closing walls thereof to lie in the aforesaid planes.

References Cited in the file of this patent

UNITED STATES PATENTS

| 2,250,276 | Rutherford | July 22, 1941 |
| 2,503,876 | Krauss | Apr. 11, 1950 |

FOREIGN PATENTS

| 483,589 | Great Britain | Apr. 22, 1938 |

OTHER REFERENCES

Publication: National "Plug-in-Strip Catalogue and Handbook" No. 1, 1938.